July 13, 1965
J. UTVITCH
3,194,569
SEALING JOINT AXIALLY SUPPORTED BY FRICTION
BETWEEN PARTS IN ROTATION IN RELATION
TO ONE ANOTHER IN A MACHINE
Filed July 3, 1961
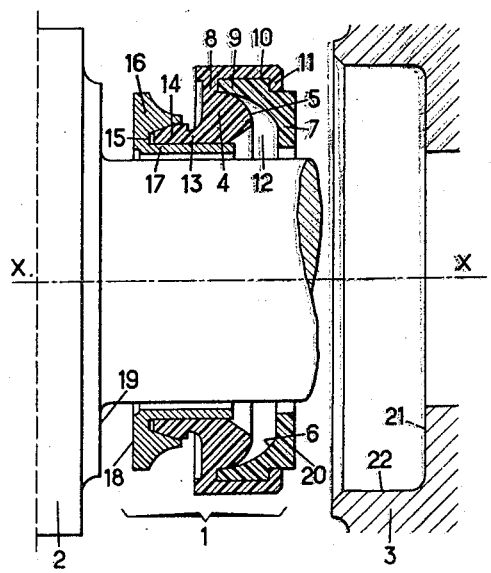
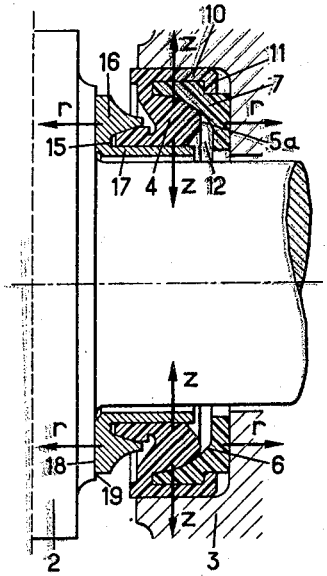
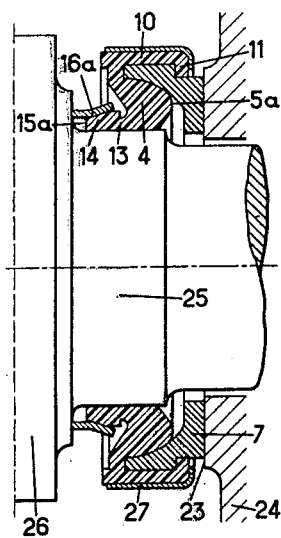
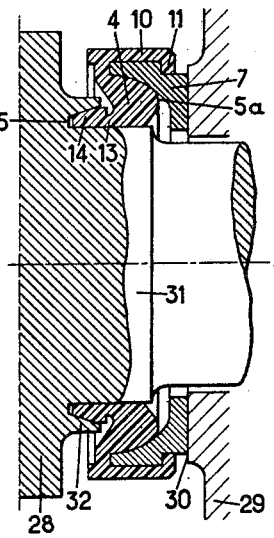
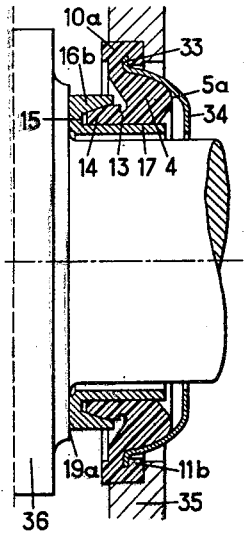
INVENTOR
J. UTVITCH 3,194,569
SEALING JOINT AXIALLY SUPPORTED BY FRICTION BETWEEN PARTS IN ROTATION IN RELATION TO ONE ANOTHER IN A MACHINE
Jovan Utvitch, 19 Square Jean Thiébaud, Paris, France
Filed July 3, 1961, Ser. No. 121,656
Claims priority, application France, July 5, 1960, 832,115, Patent 1,269,723
11 Claims. (Cl. 277—88)

The present invention relates to an annular sealing joint of the type having no metallic springs and of which one member, which is likewise annular and is made of elastically deformable material, provides the elasticity necessary for perfect fluid tightness between two co-axial machine parts performing a relative rotation, this joint in operation being co-axially compressed between the said parts and having one of its components axially in rotational friction against the adjacent face of one of the said parts.

Annular sealing joints are already known which comprise a ring of rigid material and an annular diaphragm of elastically deformable material, such as for example rubber "Silastic," or other equivalent material, in order to avoid the use of metallic springs, the said rigid ring axially supported by the said elastic diaphragm being in rotational friction against the face of one of the co-axial parts of the machine.

In practice these known joints do not give entire satisfaction because the aforesaid diaphragm is formed, when molded, with annular corrugations.

Such relatively thin folds or annular corrugations offer only elastic flexibility practically without a radial centering force which is indispensable to the maintenance in the co-axial position of the said ring which is axially under friction.

When such radial centering is absent, the simple elastic flexibility of the above mentioned folds or corrugations is moreover insufficient to prevent the rebounding of the said ring on the face of the aforesaid machine part, thus inevitably resulting in defective sealing.

The work underlying the present invention has proved that by using the same elastically deformable material, but in the form of a solid annular molding, it is possible to avoid the aforesaid double insufficiency of thin corrugations.

The judiciously predetermined shape of a solid molding of this type makes it possible to take advantage not only of simple flexibility, but in particular of the radial elastic widening out of this molding and at the same time to obtain the indispensable radial centering and the necessary axial elastic force.

The essential object of the present invention is to provide, on the basis of the experiments referred to, an elastic sealing joint which is free from the defects mentioned, which is easy and inexpensive to manufacture, and the installation of which in its operating position may be effected simply by hand, without skilled labor being necessary.

The joint constructed according to the present invention is characterised by the following arrangements, considered separately or in combination:

It comprises a ring of elastically deformable material, referred to hereinafter as "elastic ring" which has co-axially on one side, on its inner edge, a sleeve hereinafter referred to as the "central sleeve," and on the other side, co-axially and on the back of the said sleeve, a solid molding in the form of an annular relief which is heavily convex axially and which is referred to hereinafter as the "buffer," this molding engaging circularly in the concave cavity of an axial support ring, hereinafter referred to as the "concave ring," the depth of such engagement being limited by a radial collar encircling the said buffer. This collar, bearing axially on the edge of the aforesaid concave ring, carries a sleeve referred to hereinafter as the "outer sleeve" which encircles the said concave ring and ends in a circular edge on the axial support side of the said ring adjacent one of the co-axial parts of the machine. The said collar, the outer sleeve and its edge, and the aforesaid solid buffer provided with its central sleeve on its back, are molded of the same material and at the same time, so that the aforesaid elastic ring is formed in a single piece.

This ring, co-axially attached on one side by its outer sleeve to the aforesaid concave ring, is also coaxially attached on the opposite side by its central sleeve to another support ring, referred to hereinafter as the "central ring," which is provided with a co-axially directed circular groove referred to hereinafter as the "connection groove," in which the said central sleeve engages axially, terminating for the purpose in the form of a connecting part which is substantially conical on the outside or inside and which constitutes a sort of annular wedge circularly embedded in the said groove.

The said connection groove is situated at the point where the two parts of the said central ring are connected circularly, that is to say co-axially between the part by which the said central ring bears axially against the adjacent part of the machine and its tubular portion which, connecting to the back of the said axial supporting portion, engages in the opening of the said central sleeve of the aforesaid elastic ring. These two parts, which are preferably integral with one another, constitute the said central ring and in the event of the material employed being fragile or difficult to remove from the mold, the said axial supporting part is made in the form of an axial support ring separately from the said tubular portion. A tubular portion of this type, which is also made separately in this case in the form of a ring, engages together with the matching part of the aforesaid central sleeve in the opening of the said axial support ring. This opening, which is of suitable internal shape, constitutes together with the said ring the aforesaid groove for the engagement of the said matching part of the central sleeve around the aforesaid tubular ring. This ring and this axial support ring are replaced, jointly or singly, by one of the actual parts of the machine whenever the central sleeve is mounted directly by its opening on the said part, the latter then obligatorily comprising the parts according to invention permitting the tight fixing by wedging of the embedded portion of the said central ring.

An auxiliary reinforcement ring can be mounted on the said outer sleeve in order to reinforce its adhesion to the outer surface of the said concave ring, in the event adhesion by vulcanization or by simple gluing to the said concave ring is found insufficient.

In order to enable the object of the invention to be better understood, various embodiments, given as examples and illustrated in the accompanying drawings, will now be described by way of illustration and without limiting the scope of the invention to the details thereof.

In these drawings:

FIGURE 1 is a view in cross-section of one of these embodiments of the joint, illustrated in the elastically relaxed state and ready to be mounted between two co-axial parts the sealing of which it is required to effect;

FIGURE 2 is a view similar to FIGURE 1, showing the joint in use between the aforesaid co-axial parts;

FIGURES 3, 4 and 5 are similar views to FIGURE 2, showing different modes of utilisation.

Referring to FIGURE 1, it is seen that 1 designates the joint as a whole, and 2 and 3 designate the parts of a machine which it is desired to seal. In the position which it occupies in this figure, the joint 1 is elastically relaxed and its elastic ring of substantially S-shaped partial cross-section comprises a solid annular part 4 referred to hereinafter as the "buffer."

In order to facilitate the explanation which follows, it can be considered that this elastic ring is generated by the rotation of the above-specified S-section around and at a certain distance from a geometrical axis $x$—$x$.

The convex relief of the solid annular buffer 4 is partly determined by a curve 5, which, evolving towards the outside, terminates at a point where its tangent is parallel to the common geometrical axis $x$—$x$, this point by its imaginary rotation around the said axis describing a circle which determines the maximum diameter of the buffer 4. This circle bounds externally a circular zone of the buffer 4 which engages in the cavity 6 of a concave ring 7, bearing axially by its collar 8 on the edge 9 of the said ring. The collar 8 then extends axially in the form of a sleeve 10 which matches externally the body of the ring 7 and ends in a flange 11 circularly housed behind a shoulder which is provided on the said ring 7 on its side of axial support against the adjacent part of the machine.

It should be observed that the cavity 6 of the ring 7 is traced over its greater, gradually converging part according to a smaller curvature than that of the profile 5 of the buffer 4 in the elastically relaxed state, thus producing a considerable empty space 12 between the curved part 5 of the buffer 4 and the said cavity 6. This empty space 12 is necessary to permit the radial widening out of the elastic material of which the annular buffer 4 is made, which is essential in order to provide the axial elasticity of the joint in operation after it has been mounted and compressed axially.

In this form of construction of the joint it is preferable for the concave ring 7 also to be of deformable material, the use of rigid materials being envisaged for other utilisations of the joint which are illustrated by way of example in FIGURES 3, 4 and 5 and described further on.

The aforesaid elastic ring has on its inside edge and on the back of the buffer 4, axially and concentrically, a central sleeve 13 ending in a truncated conical portion 14 which engages in a connection groove 15 formed in a ring 16 having a tubular portion 17 forming a hub and which receives the said sleeve 13. The ring 16 is intended to effect the seal by transmitting through its face 18 the axial support of the said central sleeve on the face 19 of the part 2 of the machine, these faces 18 and 19 being in rotational friction once the joint is mounted for operation. The tubular portion 17 of the central ring 16 is intended to support the central sleeve 13 internally. The portions 16 and 17 which constitute the central ring are in the present case integral with one another, but it must be understood that the said central ring can be composed of two parts which, when once assembled, constitute a groove 15 permitting the engagement of the portion 14 of the central sleeve 13 around the said tubular portion.

FIGURE 2 illustrates the above-described joint mounted and co-axially compressed in operation, between the parts 2 and 3 of a machine which are to be sealed. The elastic ring has once again the shape of a capital S, but axially more compact than in FIGURE 1, because of the deformation of the buffer 4 (FIGURE 1) under the effect of the said axial compression.

By comparison with FIGURE 1, it is seen that the original shape 5 of the buffer 4 has become the shape 5a because of the elastic radial widening out of its material, thus illustrating the essential characteristic of the present invention.

Because of its freedom to expand in the space 12 formed by the cavity 6 of the concave ring 7, the mass of the elastic material of the buffer 4 (FIGURE 1) rolls, developing without friction in the said cavity as in a mould, and gradually fills it, finally assuming the shape 5a depending on the rate of compression axially applied.

Such elastic radial widening out of the solid portion constituting the buffer 4 gives rise to an axial elastic reaction expressed by equal forces $r$—$r$ acting in different directions. One of these forces is transmitted by the portion 16 and its rubbing face 18 effecting the sealing support of the said face against the face 19 of the part 2 of the machine, while the other force of the same reaction ensures the fixed and tight support of the face 20 (FIGURE 1) of the ring 7 against the end 21 of the other part 3 of the machine.

Simultaneously, the aforesaid deformation 5a of the buffer gives rise to a radial reaction expressed by the equal forces $z$—$z$, acting in opposite directions. One of these forces, directed concentrically towards the center, is supported by the tubular portion 17 of the central ring, while the same reaction directed radially in the opposite direction towards the outside and transmitted through deformable materials of the ring 7 and of the sleeve 10 ensures the tight fixing of the joint in the housing 22 (FIGURE 1) of the part 3 of the machine.

The aforesaid radial reaction acting in the two opposite directions $z$—$z$ is translated into an increased centering between the ring 7 and the tubular portion 17 of the central ring in order to maintain in a co-axial position the entire joint assembly in relation to the two co-axial parts 2 and 3.

Referring now to FIGURE 3, the elastic ring, compressed axially as in the case of FIGURE 2, is seen once again with the aforesaid S-shaped section. The same reference numbers as used in FIGURES 1 and 2 are still retained and in this case it is seen that the face 20 (FIGURE 1) of the ring 7, which is of a rigid material having a good coefficient of friction, is in rotational friction against the adjacent face 23 of the part 24 of the machine, bearing axially against the said face, and that the central sleeve 13 is mounted directly on the cylindrical portion 25 of the part 26 of the machine.

On the other side of the joint, the central sleeve 13 is introduced by its conical portion 14 into the groove 15a formed co-axially here between the opening of a ring 16a and the cylindrical portion 25 of the part 26 of the machine, this sleeve, embedded in the said groove, effecting the tight fixing of the joint on the said part 26. It is seen that the wedging of the conical part 14 of the central sleeve 13 in the groove thus formed is the same as in the case of FIGURES 1 and 2.

A ring 27 encloses the outside sleeve 10 of the joint. This ring is utilized in the case where the adhesion, by vulcanization or gluing, of this sleeve on the concave ring 7 is judged insufficient.

FIGURE 4 shows the joint according to the invention compressed co-axially between the parts 28 and 29, at the same rate as in the case of FIGURE 3 in order to facilitate the comparison. In this figure, the elastic ring is identical to that in FIGURE 3 and has the same deformation 5a of the buffer. It is seen that the concave ring 7, which is identical to that in FIGURE 3, is axially in friction against the face 30 of the part 29 of the machine. This ring 7 is of rigid material possessing a suitable coefficient of friction.

Comparing FIGURE 4 to FIGURE 3, it is seen that the joint according to the invention is likewise mounted by its central sleeve 13 directly on the cylindrical part 31 of the co-axial member 28 of the machine and that the ring 16a in FIGURE 3 is replaced by this part 28, which for this purpose has a collar 32 provided with a connecting groove 15 intended to receive the conical portion 14 of the central sleeve 13. This conical portion 14 co-axially embedded in the said groove under the effect of the axial elastic reaction of the buffer effects the tight fixing of the whole of the joint on the cylindrical part 31 of the part 28 of the machine.

The embodiment illustrated in FIGURE 5 makes it possible to obtain perfect tightness, even in the very difficult case where, owing to their arrangement and their dimensions, the co-axial parts in relative rotation in a machine provide only axially very restricted room to receive a sealing member, as in the case of bearing boxes, journal boxes of railway vehicles, trucks, or other vehicles, machine tools, textile machines, and so on.

In FIGURE 5 the elastic ring once again has the S-shaped section, and it is first seen that the joint is installed in its operating position with the same axial compression rate and with the same deformation 5a of the buffer as in FIGURE 2.

In this case, the outside sleeve 10a of the elastic ring fits the radial flange 33 of a concave ring 34 which is dish-shaped and has relatively thin walls, preferably of stamped sheet metal.

In view of the fact that the flange 33 has slight thickness, the outside sleeve 10a also has axially an extremely reduced length. In addition, because the joint be axially by the flange 11b of the sleeve 10a on the machine part 35, it will be understood that the depth necessary for housing the said sleeve and its flange is also reduced to a minimum, as compared with the space 22 in the part 3 in FIGURES 1 and 2.

The joint can thus be mounted without difficulty in the relatively thin part 35, for example the wall of a bearing box.

In FIGURE 5 it is seen that it is the part 16b of the central ring which is supported axially and with friction against the face 19a of the part 36 of the machine.

It is also seen that the tubular part 17 of the central ring 16b is introduced into the opening of the sleeve 13 in order to obtain the same effect as in the case of FIGURE 2.

What I claim is:

1. A sealing joint comprising three annular members in axial alignment, namely an intermediate member positioned between two outer members, said intermediate member being fixed to both of the outer members, one of said outer members being mounted to float on said intermediate member, and said intermediate member comprising a resilient portion which is free to flex axially of said joint toward and away from one of said outer members, said resilient portion being formed when in its elastically relaxed state with an annular recess in the surface adjoining the other of the two outer members, a thick mass of resilient material forming part of said intermediate member and provided with a curved surface constituting one side of said recess, said surface curving from the bottom of the recess toward its mouth so that said recess is wider at its mouth than at its bottom, the outer member adjacent said recessed surface being formed with an annular axially extending projection which seats in said recess, the adjacent side of said projection curving in the same direction as the curved side of said recess, the curvature of said recess side being greater than that of said projection side, so that a cavity is formed therebetween into which a portion of said mass is forced when said outer members are moved toward each other, thereby causing said projection to become more firmly held within said recess.

2. A sealing joint as claimed in claim 1, in which the outer member remote from said recessed surface is itself formed with an annular recess in the face adjacent said intermediate member, and said intermediate member is provided with an annular projection seated in said last mentioned recess.

3. A sealing joint as claimed in claim 1 in which one of said outer members is fixed to one of a pair of relatively rotatable members, and the other of said outer members is provided on the surface thereof remote from said intermediate member with a surface having a low coefficient of friction which bears against the other of said relatively rotatable members.

4. A sealing joint as claimed in claim 1 in which said projection carrying outer member is made of a resilient material and fixed to one of two relatively rotatable members, whereas the other of said outer members is made of a relatively rigid material and provided on the side away from said intermediate member with a surface having a low cofficient of friction for engagement with the other of said relatively rotatable members.

5. A sealing joint as claimed in claim 1 in which said projection carrying outer member is provided on the side away from said intermediate member with a surface having a low coefficient of friction for engagement with one of two relatively rotatable members, whereas the other outer member is fixed to the other of said relatively rotatable members and said intermediate member is fixed to said other outer member.

6. A sealing joint as claimed in claim 5 in which one of said relatively rotatable members is annular and the other relatively rotatable member comprises a shaft extending through said annular rotatable member.

7. A sealing joint as claimed in claim 1 comprising a pair of concentric relatively rotatable members, one of which is fixed to said intermediate member, while the other of said outer members is provided with a surface having a low coefficient of friction which abuts the other of said relatively rotatable members.

8. A sealing joint as claimed in claim 1 comprising rigid annular means encircling said intermediate member and confining it against outward radial expansion.

9. Sealing means comprising an annular sealing member provided with an annular axially extending projection, a coaxial sealing member on which said annular sealing member is mounted to float freely, said coaxial sealing member comprising a resilient portion which is free to flex axially of said sealing means and is provided in its elastically relaxed state with an annular recess aligned to receive said projection, a thick mass of resilient material forming part of said resilient portion and provided with a curved surface constituting one side of said recess, said surface curving from the bottom of said recess toward its mouth so that said recess is wider at its mouth than at its bottom, the adjacent side of said projection curving in the same direction as the curved side of said recess, the curvature of said recess side being greater than that of said projection side so that a cavity is formed therebetween into which a portion of said mass is forced when said sealing members are squeezed together, thereby causing said projection to become more firmly held in said recess.

10. Sealing means as claimed in claim 9 comprising rigid means encircling said resilient member and confining it against radial expansion.

11. A sealing joint as claimed in claim 7 in which the radially outer surface of the outer member formed with said projection is formed with a radial recess near the base of said projection, and said intermediate member is formed with an inwardly turned lip which seats in said radial recess to prevent withdrawal of said projection from the recess in said intermediate member.

References Cited by the Examiner
UNITED STATES PATENTS
2,294,105   8/42   Wallgren _____ 277—88 XR
2,762,640   9/56   Horvath _____ 277—124

FOREIGN PATENTS
528,972   6/54   Belgium.

LEWIS J. LENNY, Primary Examiner.
WALTER A. SCHEEL, SAMUEL ROTHBERG, EDWARD V. BENHAM, Examiners.